United States Patent [19]

Sato

[11] 3,756,609

[45] Sept. 4, 1973

[54] APPARATUS FOR AUTOMATICALLY OPERATING A SELECTED ONE OF A PLURALITY OF TAPE CASSETTES

[75] Inventor: Masaaki Sato, Tokyo, Japan

[73] Assignee: Olympus Optical Co., Ltd., Tokyo, Japan

[22] Filed: Sept. 24, 1970

[21] Appl. No.: 75,231

[52] U.S. Cl. .......... 274/4 F
[51] Int. Cl. .......... G11b 5/00
[58] Field of Search .......... 274/4 F; 40/68.4, 40/78.05; 340/174.1

[56] References Cited

UNITED STATES PATENTS

| | | | |
|---|---|---|---|
| 3,183,494 | 5/1965 | Weslh | 274/4 F |
| 3,381,910 | 5/1968 | Fundingsland | 274/4 F |
| 3,589,733 | 6/1971 | Piotrowski | 274/4 F |

*Primary Examiner*—Harry N. Haroian
*Attorney*—Kelman and Berman

[57] ABSTRACT

An automatic cassette tape player for playing a selected one of a plurality of tapes. In one embodiment, the cassettes are arranged in an ordered matrix-like array on a table. The record/playback head and tape advancing mechanism are positioned over the cassette which it is desired to play, and the cassette urged into engagement with the head. After the tape has been played, the cassette is disengaged and the head moved over the next cassette and the process repeated. In another embodiment, the cassettes are mounted onto a plurality of endless belts which are intermittently advanced to select a particular row of cassettes. Then, the playback head is caused to travel until it is positioned over a particular endless belt and then urged into engagement with the thus uniquely determined cassette.

3 Claims, 12 Drawing Figures

INVENTOR
Masaaki Sato
BY Kelman and Berman,
Agents

INVENTOR
Masaaki Sato
BY Kelman and Berman,
agents

PATENTED SEP 4 1973 3,756,609

SHEET 3 OF 6

INVENTOR
Masaaki Sato
BY Kelman and Berman,
agents

INVENTOR
Masaaki Sato
BY Kelman and Berman,
Agents

INVENTOR
Masaaki Saito
BY Kelman and Berman,
Agents

INVENTOR
Masaaki Sato
BY Kelman and Berman,
agents

APPARATUS FOR AUTOMATICALLY OPERATING A SELECTED ONE OF A PLURALITY OF TAPE CASSETTES

BACKGROUND OF THE INVENTION

The present invention relates to a device for automatically operating a selected one of a plurality of tape cassettes arranged in an array.

A device of the type described above is particularly suitable for a commercial music player in which a plurality of tape cassettes are housed and a selected one of the tape cassettes is brought to the operative position by the demand of the customer.

Prior art devices of the type described above are very complicated in construction and very expensive. Further, no device has yet been developed for automatically operating either of the tWo tracks on the tape of the tape cassette.

SUMMARY OF THE INVENTION

An object of the present invention is to provide a novel and useful device for automatically operating a selected one of a plurality of tape cassettes arranged in an array which is simple in construction and inexpensive.

Another object of the present invention is to provide a novel and useful device of the type described above in which the selection of the tape cassettes is easily effected and either of the two tracks on the tape of the cassettes can be selected for operation.

DETAILED DESCRIPTION OF THE PREFERRED EMBODIMENTS

Figure 1:
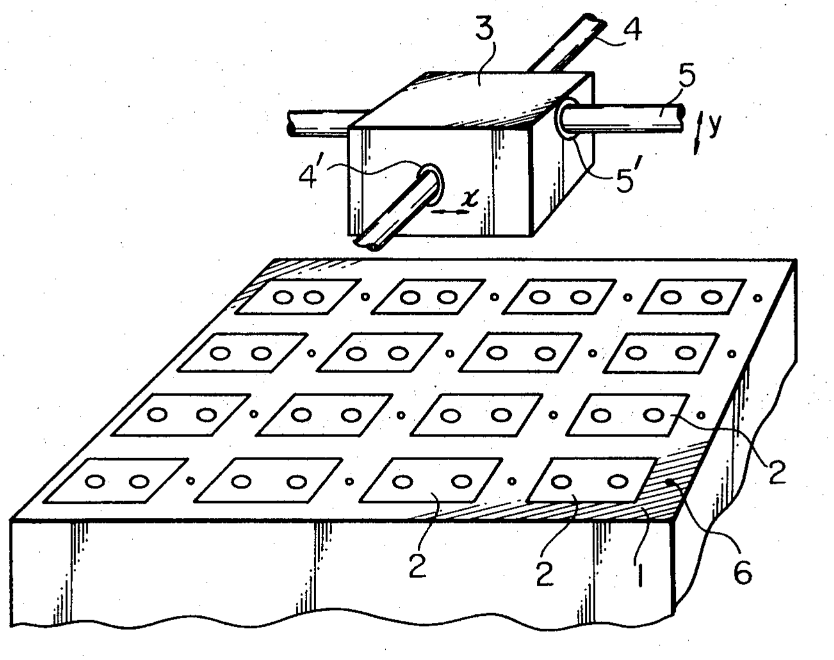
FIG. 1 is a schematic general perspective view of the first embodiment of the present invention.

Referring to FIG. 1, the first embodiment of the device of the present invention comprises a stationary table 1 on which a plurality of tape cassettes 2 are arranged in regular order in two directions *x*, *y* perpendicular to each other and a cassette loading mechanism 3 incorporating therein a tape operating means. Each of cassettes 2 is received in the respective recess 1' formed in table 1 as shown in FIG. 1. Cassette loading and tape operating mechanism 3 is guided by guide bar 4 so as to move in the y direction while cassette loading mechanism 3 is guided by guide bar 5 to move in the x direction, so that cassette loading mechanism 3 is moved over the area in which the array of cassettes 2 on table 1 is positioned so as to be aligned with any of cassettes 2 in the array. Of course, either of bars 4, 5 are movable in a direction laterally of the length thereof so as to allow cassette loading mechanism 3 to be moved in the plane defined by the directions *x*, *y*.

Figure 2:
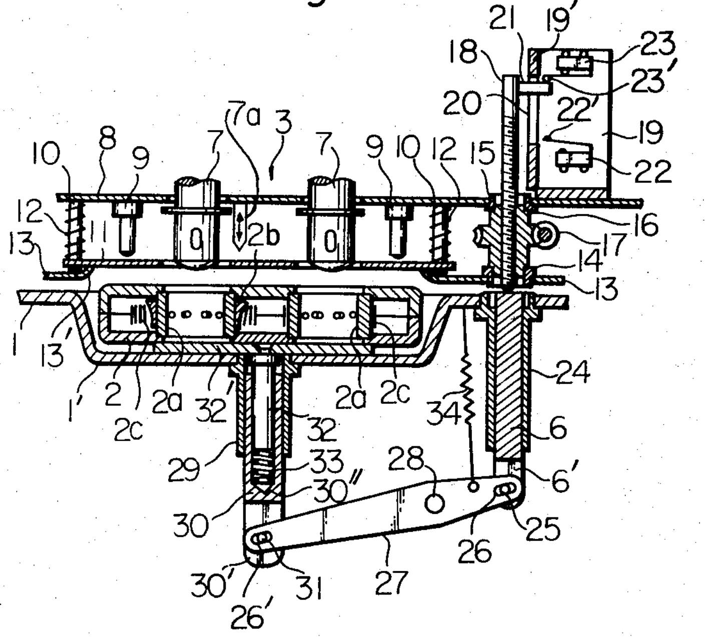
FIG. 2 is a fragmentary sectional view showing the detail of the main portion of FIG. 1 which is used with the cassette having an endless tape therein.

Referring to FIG. 2 showing the device for use with cassettes of an endless-tape type, cassette loading mechanism 3 comprises chassis 8 and cover plate 13. Cover plate 13 is formed with an opening 13' for receiving therethrough a cassette 2 to be loaded in cassette loading mechanism 3. Cassette loading deck 11 is provided between chassis 8 and cover plate 13 and guided by guide pins 10 secured to chassis 8 in alignment with opening 13'. Deck 11 is normally urged toward opening 13' to close the same by springs 12 provided around pins 10. The tape operating mechanism comprises spindles 7, 7 passing through chassis 8 and deck 11 and driven by a driving mechanism (not shown), a recording/reproducing head 7*a* (not shown in FIG. 3), a capstan (not shown) and a pinch roller (also not shown) which are conventional and are not described in detail here. Cassette 2 is of a conventional type having an endless tape 2*c* and comprises a pair of hubs 2*a*, 2*a* one of which is provided with tape winding reel 2*b*. Guide pins 9 are secured to chassis 8 and are adapted to guide cassette 2 in the operative position when loaded in the tape operating means. In order to operate cassette 2, the same is lifted from recess 1' and moved inwardly of the tape operating means through opening 13' together with deck 11 against the action of springs 12. Guide pins 9 pass through openings provided in deck 11 and cassettes 2 to properly guide cassette 2 in the operative position thereof and spindles 7 engage hubs 2*a*, 2*a* while the tape 2*c* engages with the recording/reproducing head not shown and the pinch roller not shown for operation.

A worm wheel 16 is rotatably journaled in bearings 14, 12 which are secured to cover plate 11 and chassis 8, respectively. Worm wheel 16 is rotated by a worm 17 meshing therewith and driven by a reversible motor (not shown). A threaded rod 18 is engaged with the internal thread formed in worm wheel 16. Rod 18 is prevented from being rotated by a pin 21 secured to the upper end of rod 18 and slidably engaging with an elongated hole 20 in switch plate 19 so that rod 18 is moved upwardly or downwardly when worm wheel 16 is rotated in one or the other direction by the reversible motor. Microswitches 22, 23 are provided in switch plate 19 and either of actuating rods 22', 23' of switches 22, 23 is actuated when pin 21 is moved to its uppermost or lowermost position. The operation of switches 22, 23 is described later.

A bearing sleeve 24 is provided in table 1 adjacent to each of recesses 1' and a rod 6 is slidably fitted in sleeve 24. The position of rod 6 is so determined that threaded rod 18 of cassette loading mechanism 3 is aligned with rod 6 when mechanism 3 is positioned over the cassette 2 loaded in recess 1' adjacent to which rod 6 is located. The lower end of rod 6 is pivotally connected to one end of a swingable lever 27 pivoted about pivot shaft 28 by the slidable engagement of pin 25 provided in the slit 6' at the lower end of rod 6 with an elongated hole 26. Lever 27 is urged in the anticlockwise direction by spring 34 with its one end secured to lever 27 adjacent to hole 26 and with its other end secured to table 1.

A rod 30 is slidably fitted in bearing sleeve 29 secured to recess 1' near the center thereof and the lower end of rod 30 is pivotally connected to the other end of lever 27 by the slidable engagement of pin 31 secured in slit 30' at the lower end of rod 30 with elongated hole 26' of lever 26. Rod 30 is provided with blind hole 30'' and a cassette lifting rod 32 is slidably fitted in blind hole 30'' and urged upwardly by spring 33 located in the blind hole 30'' under the lower end of rod 32. Cassette lifting plate 32' is located on the bottom of recess 1' under the lower side of cassette 2 received in recess 1' and plate 32' is secured to the upper end of rod 32. Thus, when threaded rod 18 is lowered to urge rod 6 downwardly against the action of spring 34, lever 27 is rotated in the clockwise direction to urge rod 30 and, hence, rod 32 upwardly together with cassette lifting plate 32' so that cassette 2 in recess 1' is urged upwardly into the operative position shown in FIG. 3.

Figure 3:
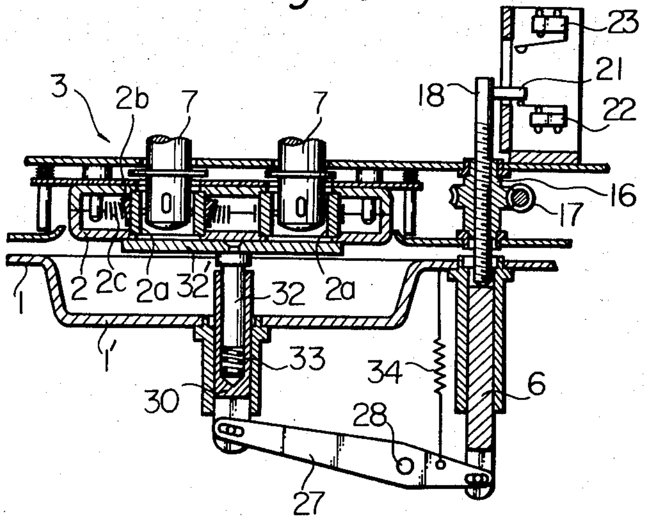
FIG. 3 is a view similar to FIG. 2 but showing the cassette positioned in its operative position.
Figures 4, 5, 6:
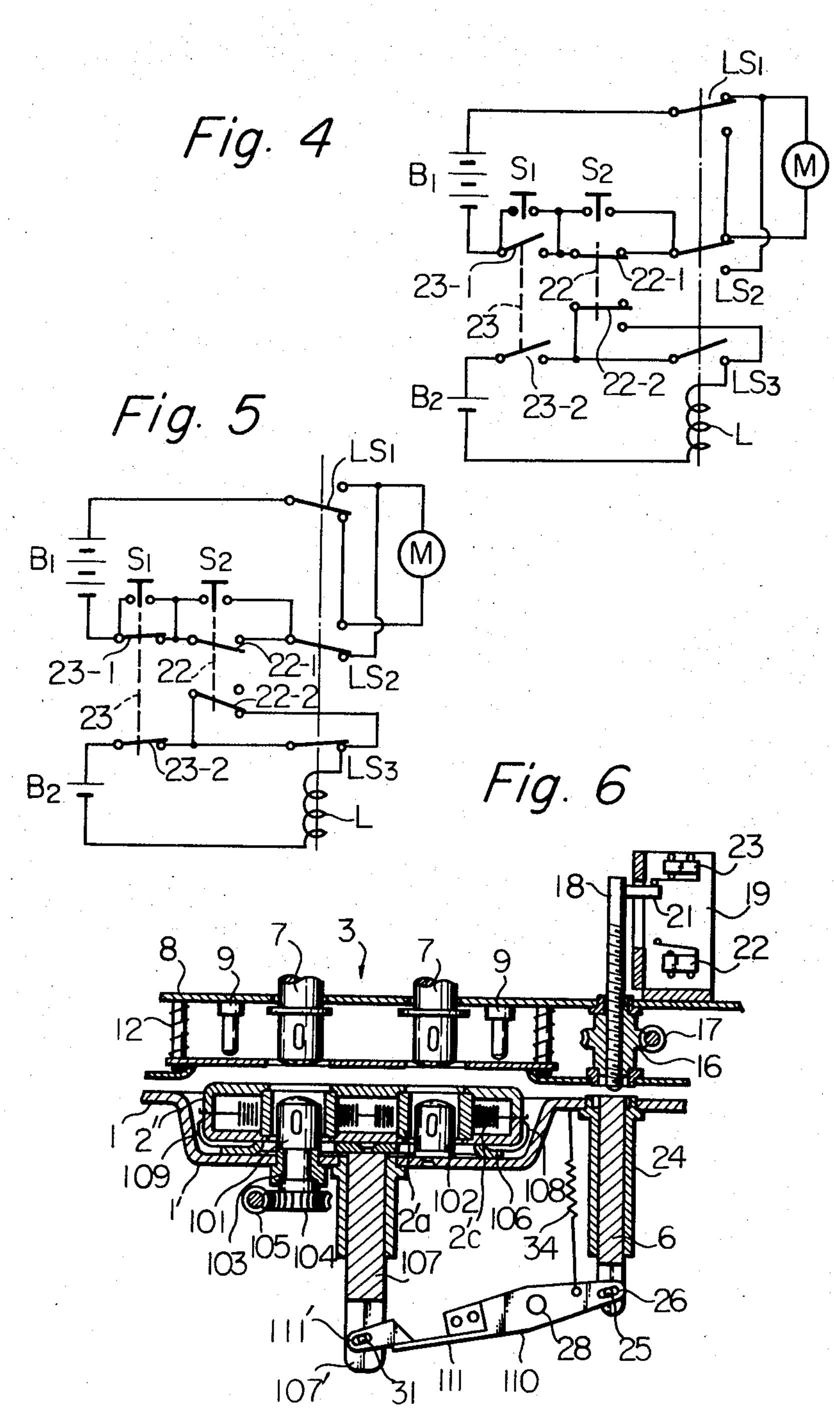
FIG. 4 and 5 are diagrams showing the electric circuit used in the device of FIG. 1.
FIG. 6 is a fragmentary sectional view similar to FIG. 2 but showing a modification of the device of FIG. 2 with which a cassette having a non-endless tape is used.

FIGS. 4, 5 show the electric circuit used in the device of FIGS. 2, 3.

In FIG. 4, electric source B1 is for energizing reversible motor M for driving worm 17 in FIG. 2, while electric source B2 is for energizing relay L. Relay L has contacts LS1, LS2 and LS3 connected as shown in FIG. 4, and microswitch 22 also shown in FIGS. 2, 3 has normally closed contact 22–1 and normally opened contact 22–2 connected as shown in FIG. 4, while microswitch 23 has normally closed contacts 23–1, 23–2 connected as shown. Starting switch S1 is temporarily closed when cassette loading mechanism 3 is brought to the position above the selected cassette 2. Starting switch S2 is temporarily closed when the operation of the selected cassette 2 is terminated so as to commence the reverse rotation of motor M. In the figure, switches S1, S2 are shown as being in the form of push buttons.

In operation, when the device is actuated to select any of cassettes 2 for the operation by a selecting button (not shown), the *x*, *y*-coordinates of the location of the selected cassette 2 is detected to move cassette loading mechanism 3 above the selected cassette 2 in alignment therewith as shown in FIG. 2. Then, switch S1 is temporarily closed under the condition of the electric circuit shown in FIG. 4 so that the motor energizing circuit is temporarily closed to commence the rotation of motor M. Thus, rod 18 is lowered through the engagement of worm 17 and worm wheel 16 and pin 21 is disengaged from switch 23 to close contacts 23–1 and 23–2 as shown in FIG. 5 thereby permitting motor M to continue to rotate even though switch S1 is opened.

At the lowermost position of rod 18 shown in FIG. 3, pin 21 actuates switch 22 so that normally closed contact 22–1 is opened while normally opened contact 22–2 is closed as shown in FIG. 5. Thus, motor M is deenergized by the opening of contact 22–1.

At the same time, rod 6 is lowered to lift rod 30 through the rotation of lever 27 coupled thereto by the downward movement of rod 18 so that cassette 2 is moved upwardly in the operative position as shown in FIG. 3 by cassette lifting plate 32' and maintained at its operative position by the stoppage of motor M.

Therefore, spindles 7, 7 engage with hubs **2*a* of cassette 2 and the tape operating means is ready for the operation. By a signal generated by the actuation of microswitch 22**, the tape operating means is operated to record or to reporduce the informations on or from the tape.

During the operation of the cassette 2, the electric circuit of motor M is held in the condition shown in FIG. 5. In other words, contacts 23–2 and 22–2 are closed so that relay L is energized thereby permitting contacts LS1, LS2 to switch the electric circuit for the reverse rotation of motor M while contact LS3 permits relay L to be self-latching until contact 23–2 is opened.

When the operation of cassette 2 comes to the end, a signal is generated, for example, by the short-circuiting of a pair of sensing devices contacting the tape by means of an electrically conductive portion provided in the tape at a position corresponding to the end of the operation, and the operation of the tape operating means is terminated, while starting switch S2 is temporarily closed so that motor M commences to rotate in the reverse direction to move rod 18 upwardly from the position shown in FIG. 3 through the engagement of worm 17 and worm wheel 16.

Thus, microswitch 22 is disengaged from pin 21 to close contact 22–1 and open contact 22–2 as shown in FIG. 4. By the closure of contact 22–1, motor M continues to rotate in the reverse direction even though switch S2 is opened thereby lowering cassette 2 into recess 1' as shown in FIG. 2. At the same time, pin 21 actuates switch 23 to open both contacts 23–1, 23–2 as shown in FIG. 4 so that relay L is released thereby returning the electric circuit to the condition shown in FIG. 4.

FIG. 6 shows a modification of the device of FIG. 2. In this case, cassettes 2' having non-endless tapes are used with the device.

Cassettes 2' is substantially similar to cassette 2 shown in FIG. 2 except that one end of the tape **2*c'* is secured to one of the hubs 2*a'* while the other end of tape 2*c'* is secured to the other of hubs 2*a'* so that the tape 2*c'* is wound and rewound on either of hubs 2*a'***.

In this case, lever 110 having leaf spring 111 replaces rod 30 and spring 33 in FIG. 2, however, the operation is substantially similar to that shown in FIG. 2.

Rewinding spindle 101 and idle spindle 102 are rotatably provided in recess 1' in table 1 so as to be engaged with hubs **2*a'* when cassette 2' is placed in recess 1', and the shaft of spindle 101 rotatably journaled by bearing 103 extends downwardly through the bottom of recess 1'. Deck 106 which is similar to deck 32' in FIG. 2 is provided with openings for passing therethrough spindles 101, 102, respectively. Deck 106 is secured to rod 107 which is similar in operation to that of rod 32 in FIG. 2. A worm wheel 104 is secured to the lower end of the shaft of spindle 101. A worm 105** driven by a motor (not shown) is engaged with worm wheel 104 so that spindle 101 is rotated to rewind the tape 2c' in cassette 2' when cassette 2' is placed in recess 1' after the operation of cassette 2' has been terminated. The motor for driving spindle 101 may be energized by a signal generated when the tape operating means is moved to the succeeding cassette 2'. The rewinding operation may be automatically terminated by a signal generated by the short-circuiting of a pair of sensing devices contacting the tape 2' when an electrically conductive portion on the tape 2' comes to contact with the sensing devices.

In order to insure that cassette 2' is properly positioned in recess 1', deck 106 is provided with a pair of embracing springs 108, 109 so that spindles 101, 102 are snugly fitted in hubs 2a' when cassette 2' is received in recess 1'.

Figure 7:
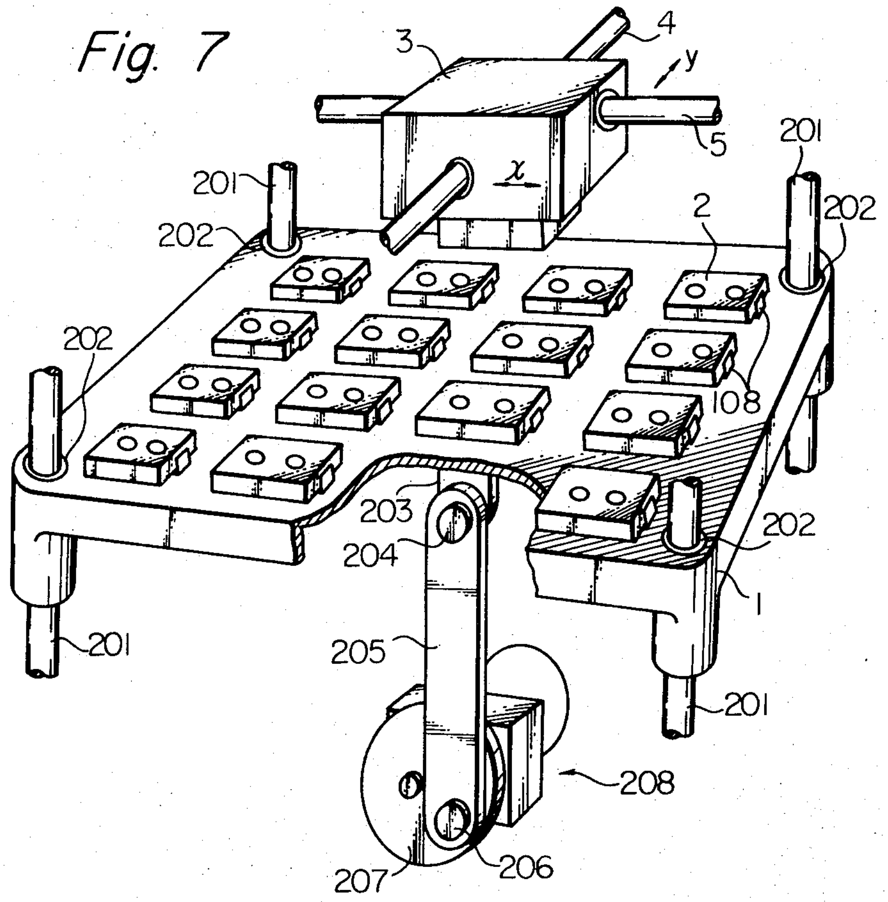
FIG. 7 is a schematic general perspective view similar to FIG. 1 but showing a modification of the device of FIG. 1 in which the table mounting thereon is moved vertically as a whole.

FIG. 7, 8 show a modification of the device of FIG. 1 in which table 1 is moved vertically so that the array of cassettes 2 are moved vertically as a whole so as to locate selected one of cassette 2 in the operative position in the tape operating means.

In this case, cassette 2 is located on raised portion 1'' formed in table 1 and a pair of embracing springs 108, 109 are secured to raised portion 1'' so as to locate cassette 2 in position on raised portion 1''.

Table 1 is guided for the vertical movement by guide rods 201 journaled in bearings 202 provided in the four corners of table 1.

Table 1 is provided with projection 203 at the center of the lower surface thereof which is pivotally connected to one end of connecting rod 205 by pin 204 secured to projection 203. The other end of connecting rod 205 is pivoted to crank disc 207 by pin 206 secured to disc 207. Crank disc 207 is driven by geared motor 208 so as to move reciprocally table 1 through connecting rod 205.

An electric circuit similar to that shown in FIGS. 4, 5 may be used for energizing geared motor 208. In this case, however, geared motor 208 is connected in the circuit in place of motor M of FIG. 4 and microswitches 22, 23 are so arranged that microswitch 22 is actuated by table 1 at the uppermost position of table 1 while microswitch 23 is actuated by table 1 at the lowermost position of table 1.

The operation of the device of FIG. 7, 8 is similar to that of the device of FIG. 1 except that the array of cassettes 2 are moved as a whole together with table 1 for bringing the selected cassette 2 in its operative position in the tape operating means.

Figure 8:
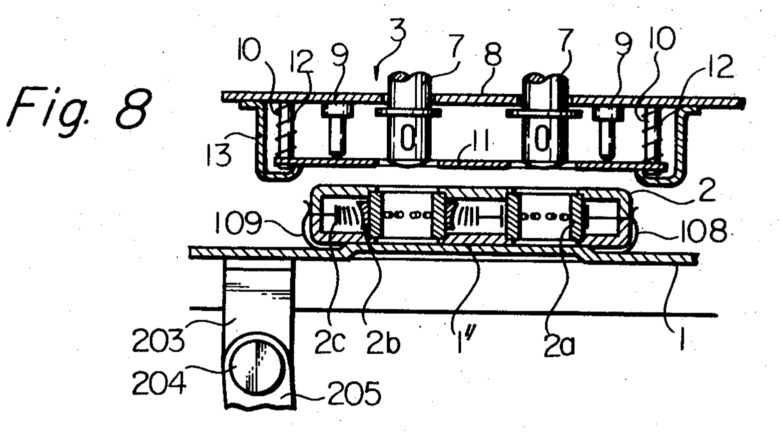
FIG. 8 is a fragmentary sectional view showing the detail of the main portion of the device of FIG. 7.

In FIG. 8, cassette 2 having an endless tape therein is shown. It is evident, however, that cassette 2' having a non-endless tape therein may be used by providing a rewinding spindle similar to that shown in FIG. 6 which is driven by a motor through worm means similar to that shown in FIG. 6.

In the embodiments described above, the cassettes are described to be moved vertically by a reversible motor. But solenoid means may be used in place of the reversible motor. In this case, a solenoid is located in the table for each of the cassettes, and the solenoid is electrically connected to the cassette loading mechanism so as to be actuated in timed relation thereto.

Further, a single motor may be commonly used for rewinding the tape in each of the cassettes by providing driving shafts driven by the motor, which are coupled to the respective rewinding spindles through electromagnetic clutches for selectively coupling and disconnecting the coupling.

Figure 9:
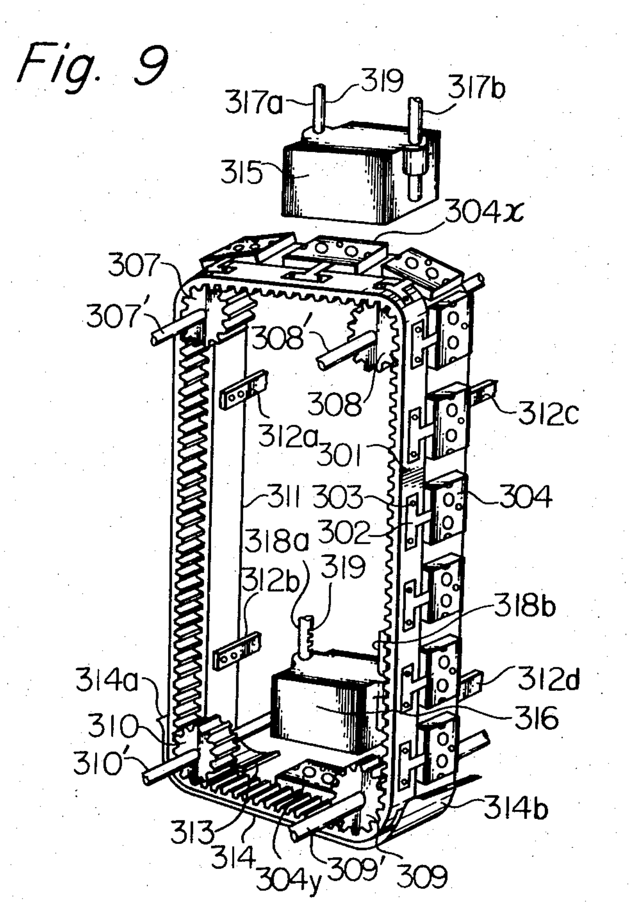
FIG. 9 is a schematic general perspective view of the second embodiment of the present invention in which an endless belt is used for arranging the cassettes.
Figure 10:
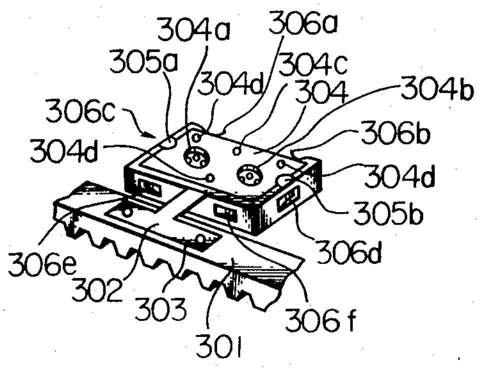
FIG. 10 is a fragmentary perspective view showing the mounting of a cassette on the endless belt of FIG. 9.

FIGS. 9, 10 show a second embodiment of the present invention. In this case, the cassettes are mounted on an intermittently driven endless belt, and the cassette loading mechanism is lowered onto the selected cassette, when the same is located beneath the cassette loading mechanism in alignment therewith.

Referring to FIG. 9, endless belt 301 made of, for example, polyurethane rubber is guided by guiding gears 307 – 310 fixed to shafts 307' – 310' and meshing with the internal rack teeth formed in the inner periphery of belt 301 within a casing (not shown) of the device. A plurality of cassette holders 302 are secured to belt 301 at appropriate intervals by rivets 303. Cassette holder 302 is made of a resilient thin plate formed to embrace cassette 304 and is provided with four claws (of which two are shown by reference numerals 305a, 305b) for holding cassette 304 in position perpendicular to the plane of belt 301 and inwardly bent portions 306a, - - - 306f for maintaining cassette 304 in position within holder 302. Thus, cassettes 304 are mounted on belt 301 at appropriate intervals with the faces of cassettes 304 located in parallel to the stretch of belt 301 so that cassettes 304 are guided in the path parallel to the stretch of belt 301 with an appropriate distance held between the adjacent cassettes 304. Belt 301 is driven intermittently by one of shafts 307' – 310' secured to gears 307 – 310 by means of a motor (not shown) provided in the casing of the device.

U-shaped strip 311 made of metal or plastic is located along the inside of the path of cassettes 304 so as to guide cassettes 304. Lower ends of strip 311 are bent inwardly so as to provide inwardly bent edges 313 between which a clearance is formed through which cassette loading mechanism 316 is moved to cooperate with cassette 304y located beneath the clearance. Strip 311 is secured to the casing by mounting pieces 312a, - - - 312d.

Another U-shaped strip 314 is provided beneath the lower stretch of the path of cassettes 304 mounted on belt 301. End portions 314a and 314b of strip 314 are shaped so as to smoothly guide cassettes 304 when they are moved in the bent portion of the path of movement of cassettes 304. Cassette loading mechanism 315 is located above the upper horizontal stretch of the path of movement of cassettes 304, i.e., at the outside of the looped path of movement of cassettes 304 while cassette loading mechanism 316 is located above the lower stretch of the path of movement of cassettes 304, i.e., at the inside of the looped path of movement of cassettes 304 as shown. Cassette loading mechanisms 315, 316 are guided for vertical movement by guide rods 317a, 317b; 318a, 318b, respectively. Guide rods 317a, - - - 318b are provided with rack teeth 319 meshing with pinions (not shown) driven by motors incorporated in cassette loading mechanisms 315, 316, respectively, so that cassette loading mechanism 315, 316 are lowered and raised by the motors.

In operation, when the track of the tape adjacent to the outer face of the cassette 304 is desired to be operated, cassette loading mechanism 315 is lowered when selected one of cassettes 304x is located beneath the mechanism 315 so that cassette 304 is brought to its operative position. When the track of the tape adjacent to the inside face of the cassette 304 is desired to be operated, cassette loading mechanism 316 is lowered when selected one of cassettes 304y is placed beneath mechanism 316. Thus, either of the tracks on the tape can be selectively operated.

Cassettes 304 are provided with hubs 304a, 304b similar to 2a shown in FIG. 2 and guide holes 304d similar to those for receiving guide pins 9 shown in FIG. 2. Hole 304c is for receiving the capstan in like manner as described in connection with FIG. 2.

Strips 311 or 314 serves to hold selected cassette 304x or 304y in position so as to permit the same to be brought properly into its operative position.

Figure 11:
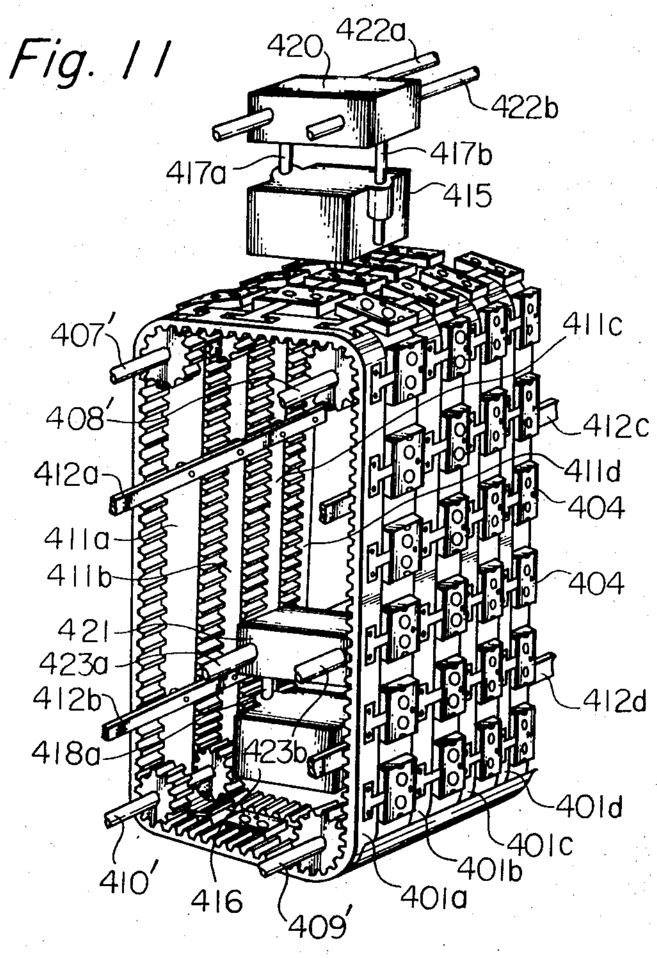
FIG. 11 is a view similar to FIG. 9 but showing a modification of the device of FIG. 9 in which a plurality of endless belts are arranged in juxtaposed relationship so as to increase the number of cassettes to be selectively operated.

FIG. 11 shows a modification of FIG. 9 in which a plurality of juxtaposed endless belts 401a, - - - 401d are provided so as to increase the number of cassettes 404 to be selected for the operation. In this case, cassette loading mechanisms 415, 416 are moved across belts 401a, - - - 401d so as to locate the mechanisms 415, 416 on the selected path of movement of cassettes 404 mounted on belts 401a, - - - 401d.

The operation of the device of FIG. 11 is similar to that of FIG. 9.

The movement of mechanisms 315, 316; 415, 416 is coupled with the intermittent movement of belts 301; 401a, - - - 401d.

Figure 12:
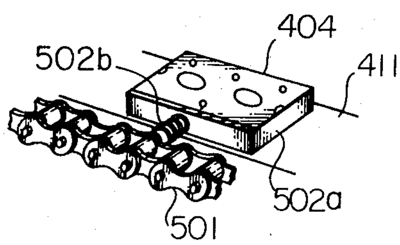
FIG. 12 is a fragmentary perspective view similar to FIG. 10 but showing a modification of the mounting of a cassette on an endless roller-chain used in place of the endless belt shown in FIG. 9.

FIG. 12 shows a modification of the mounting of cassettes 404. In this case, endless roller chain 501 is replaced for belt 301 shown in FIG. 10 and holder 502a and spring 502b are replaced for holder 302 shown in FIG. 10. However, the operation is similar to that shown in FIG. 10.

I claim:

1. Apparatus for automatically operating a selected one of a plurality of tape cassettes arranged in an ordered array which comprises:

a. a cassette-receiving table, said array including a plurality of cassettes positioned on said table;

b. tape operating means including a playback/record head and a tape advancing mechanism for advancing the tape in said selected cassette past said playback/record head;

c. moving means for moving said operating means relative to said array and for thereby positioning said operating means proximate said selected cassette;

d. urging means for urging the positioned operating means and said selected cassette toward one another to engage said selected cassette with said operating means, whereby said tape may be played, the urging means being reversible to withdraw said selected cassette out of engagement with said operating means when said cassette has been played, said urging means including a cassette lifting mechanism positioned beneath each cassette on said table for lifting said cassette upwardly of said table toward said operating means and including means for lowering said cassette out of engagement with said operating means and back down onto said table in response to an end of play signal generated in said cassette.

2. Apparatus as set forth in claim 1, wherein said cassettes are positioned on said table in mutually orthogonal rows, and said moving means include means for moving said operating means along axes parallel to said mutually orthogonal rows and columns.

3. The apparatus according to claim 2, further comprising tape re-winding means, selectively connectable to each cassette in said array, for re-winding the tape in said selected one of the plurality of cassettes, after the cassette has been played and returned to its original position on the table.

* * * * *

UNITED STATES PATENT OFFICE

CERTIFICATE OF CORRECTION

Patent No. 3,756,609 Dated September 4, 1973

Inventor(s) MASAAKI SATO

It is certified that error appears in the above-identified patent and that said Letters Patent are hereby corrected as shown below:

In the heading, after line /21/ insert --

/30/ Foreign Application Priority Data

| | | | |
|---|---|---|---|
| Sept. 25, 1969 | Japan | .............. | 75811/1969 |
| April 10, 1970 | Japan | .............. | 30179/1970 |

Signed and sealed this 18th day of December 1973.

(SEAL)
Attest:

EDWARD M. FLETCHER, JR.
Attesting Officer

RENE D. TEGTMEYER
Acting Commissioner of Patents